United States Patent [19]

Sedlacek et al.

[11] 4,061,966
[45] Dec. 6, 1977

[54] METHOD AND APPARATUS FOR GENERATING A CONTINUOUS MAGNETIC FIELD DETERMINING THE POSITION OF AN INDUCTIVE SENSING ELEMENT THEREIN

[75] Inventors: Pavel Sedlacek, Klecany; Jiri Hajek, Prague, both of Czechoslovakia

[73] Assignee: Ceskoslovenska akademie ved, Prague, Czechoslovakia

[21] Appl. No.: 650,020

[22] Filed: Jan. 19, 1976

[30] Foreign Application Priority Data

Jan. 20, 1975 Czechoslovakia .................... 374/75

[51] Int. Cl.² .......................................... G01R 33/12
[52] U.S. Cl. .................................... 324/207; 340/282
[58] Field of Search ................ 324/34 R, 34 D, 34 B, 324/66, 67; 340/282

[56] References Cited

U.S. PATENT DOCUMENTS

3,270,281  8/1966  Mandle ................................ 340/282

FOREIGN PATENT DOCUMENTS

1,189,981  4/1970  United Kingdom .............. 324/34 D
1,259,787  1/1972  United Kingdom ................ 340/282

OTHER PUBLICATIONS

Moore, R. P.; Digital Phase Angle Meter Control; IBM Tech. Bull., vol. 3; No. 2; July 1960; p. 35.

*Primary Examiner*—Robert J. Corcoran

[57] ABSTRACT

A technique for sensing the relative position of a cursor or other indicator integral with an inductive sensing element along at least one coordinate of a specified area is described. An array of conductors are sequentially arranged along the coordinate and are sequentially excited by a sequence of adjacent, substantially rectangular voltage pulses to yield an overlapping current distribution to simulate a continuous travelling-wave magnetic field along the coordinate. The induced voltage response of the sensing element is a continuous wave form which passes through a predetermined level at a time, relative to the start of movement of the travelling wave magnetic field, that is indicative of the relative position of the element along the coordinate. A threshold detector element which outpulses an indication upon the attainment of such specified value of induced voltage response is coupled, along with a signal indicative of the start of excitation of the conductors, to suitable digital comparison circuitry to yield a position read-out of the system.

8 Claims, 17 Drawing Figures

METHOD AND APPARATUS FOR GENERATING A CONTINUOUS MAGNETIC FIELD DETERMINING THE POSITION OF AN INDUCTIVE SENSING ELEMENT THEREIN

BACKGROUND OF THE INVENTION

The invention relates to techniques for sensing the relative position of an inductive sensing element along a specified direction or coordinate, and more particularly to techniques of this type employing an array of conductive elements sequentially arranged in parallel along such coordinate and disposed in magnetic coupling relation to the sensing element.

In existing facilities of this type, the successive conductors are excited sequentially with spaced, substantially rectangular current pulses to induce an impulse-type voltage resonse in the sensing element. Such voltage response exhibits a plurality of successive amplitude spikes, corresponding to the number of conductors disposed along the test area, and the amplitude distribution of the spikes is detected as an indication of the position of the sensing element with respect to a reference point of the test area, such reference point arbitrarily corresponding to the start of the cycle of excitation of the conductor array; in general, the position of the sensing element is correlated with the time of occurrence of the largest amplitude spike of the induced voltage response.

Such arrangements are complicated and inaccurate, and do not permit of ready interpolation of position between the successive conductors unless an inordinate number of such conductors are distributed in a relatively small area to be measured.

SUMMARY OF THE INVENTION

The method and apparatus of the present invention provides an accurate and inexpensive technique for sensing the relative position of the sensing element along a desired coordinate in a manner that is far more independent of the size of the measured area and the number of conductors than is true of present designs. Illustratively, the successive conductors in the array are energized in a pattern adapted to yield a substantially continuous, travelling-wave magnetic field along the coordinate direction to produce a correspondingly continuous induced voltage response in the sensing element. A prescribed instant, relative to the start of excitation of the conductors, at which the continuous induced voltage response in the sensing element reaches a predetermined value in a prescribed direction (e.g., when the induced voltage response passes through zero in a negtive-going direction) is suitably detected as an indication of the relative position of the element on the coordinate.

In order to stimulate the desired travelling-wave type magnetic field (which passes continuously between as well as over the conductors and thereby makes interpolation simple and accurate), an arrangement including a clock pulse generator and an associated binary counter are arranged to generate a sequence of adjacent, substantially rectangular voltage pulses for application to the successive conductors in the array; the resulting overlapping, substantially triangular current distribution in the conductors provides the required wave stimulation. Advantageously, a suitable sequential pulse distributor is disposed at the interface between one or more outputs of the binary counter and the conductor inputs. A suitable threshhold detector is coupled to the output of the sensing element to yield an indication when the above-mentioned desired point on the induced voltage response of the sensing element is reached, and such indication is applied to an inhibiting input of a binary register whose count is stepped by the clock pulse generator starting at the beginning of the conductor excitation cycle. The resultant count accumulated by the binary register is an indication of the desired position of the sensing element.

BRIEF DESCRIPTION OF THE DRAWING

The invention is further set forth in the following detailed description taken in conjunction with the appended drawing, in which.

DETAILED DESCRIPTION

Figure 1:
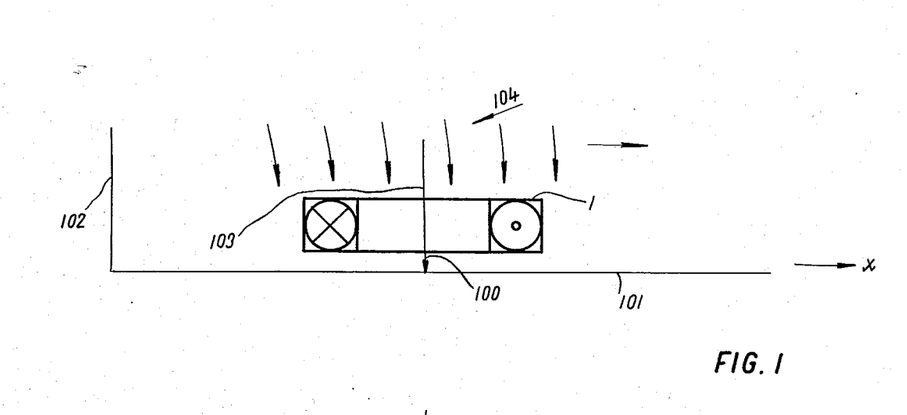
FIG. 1 is a diagrammatic representation of a travelling-wave magnetic field cutting an electromagnetic sensing element that is disposed a predetermined distance from a reference plane along a prescribed coordinate.
Figure 2:
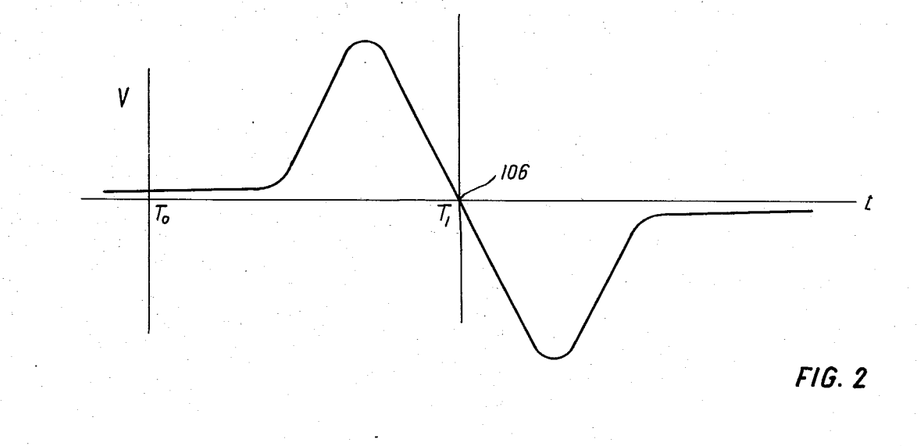
FIG. 2 is a curve representing the form of voltage response induced in the sensing element of FIG. 1 upon being excited by the travelling-wave magnetic field.

Referring now to the drawing, a schematic indication of the principle of electromagnetic sensing in accordance with the invention is depicted in FIGS. 1 and 2. A pointer or cursor 100, illustrative of a mechanical indicating device whose position along a desired coordinate (illustratively referred to as X in the drawing) along a surface 101 from an arbitrary reference plane 102 is associated with an inductive-type sensing element represented by a coil 1. The sensing arrangement is adapted in particular to indicate the distance of the pointer 100, aligned with an axis 103 of the coil 1, from the reference plane 102.

A continuous, travelling-wave magnetic field 104 proceeding to the right in the direction X as viewed in the drawing emanates from a reference point at the plane 102 for inducing a correspondingly continuous voltage response in the coil 1, in the general manner shown in FIG. 2. Such induced voltage response is approximately similar to a sine curve, and exhibits a predetermined value (e.g., the indicated zero value 106) in the negative-going direction at a time $T_1$, measured relative to a reference time $T_0$ corresponding to the start of emanation of the travelling wave magnetic field 104, that is proportional to the distance of the cursor 100 from the reference plane 102 in the direction X. Since the induced voltage response is continuous, the accuracy of determination of the position of the cursor is limited only by the resolution of a measuring apparatus to be subseuently described, and is in no way limited by the technique itself.

Figure 3:
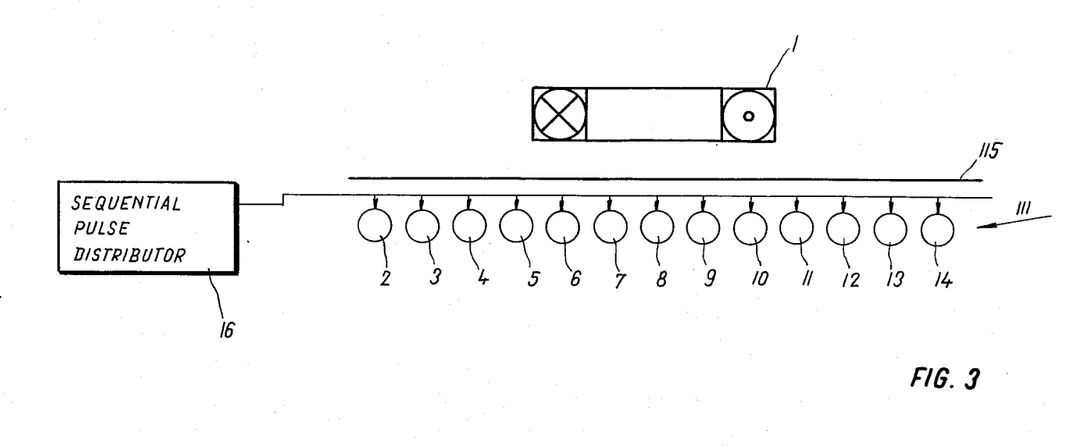
FIG. 3 is a diagrammatic representation of a sequential array of conductors disposed along a given coordinate and adapted to be excited to simulate the travelling-wave magnetic field and the associated induced voltage response of FIGS. 1 and 2.

Referring to FIG. 3, an arrangement is depicted for generating a travelling wave magnetic field that approximates the continuous field of FIG. 1 that yields the continuous induced voltage response of FIG. 2. The arrangement includes an array 111 of electrical conductors 2-14 which are sequentially disposed in the direction X along which the sensor 1 is positioned. The array 111 is further disposed in magnetic coupling relation to the sensor 1.

Figure 4A:
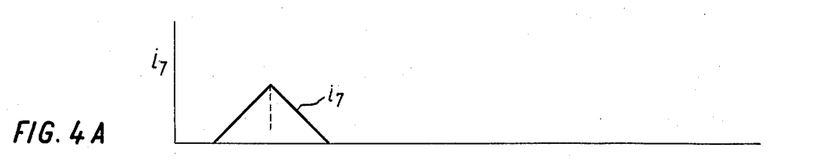
FIGS. 4a, 5a and 6a are curves representing idealized current excitations of the successive conductors of FIG. 3 to simulate the travelling-wave magnetic field of FIG. 1.
Figure 5A:
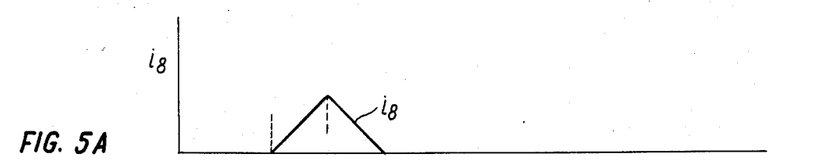
Figure 6A:
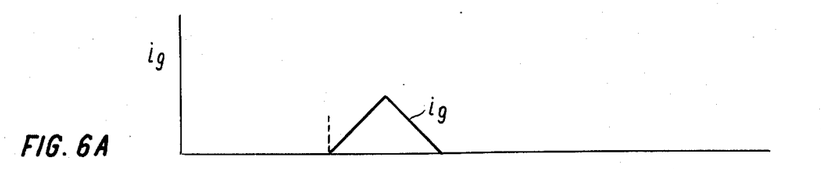

The successive conductors 2-14 are assumed to be excited with an overlapping current distribution of the general type indicated (for the conductors 7-9) in FIGS. 4a, 5a and 6a. As indicated, the current distribution ideally has a linearly rising and subsequently linearly falling portion, with the start of the rising portion of each conductor coinciding with the start of the falling portion of the preceding conductor. The resulting overlapping current distribution over the array 111 has beenn found effective to approximate the continuous, travelling-wave magnetic field 104 of FIG. 1. In order to accomplish this, FIG. 3 schematically depicts the conductors 2-14 as being excited by a sequential pulse distributor 16, whose characteristics are indicated in further detail in connection with the positioning circuit of FIG. 7.

If desired, a separate continuous conductive plate 115 can be disposed intermediate and in magnetically coupled relation to both the array 111 and the sensor 1, such plate being thereby separated for each of them along a line perpendicular to the direction X. The current induced in the plate 115 by the flow in the conductors 2-14 has in some cases be found to yield a more nearly continuous magnetic field through the sensor 1.

Figure 4B:
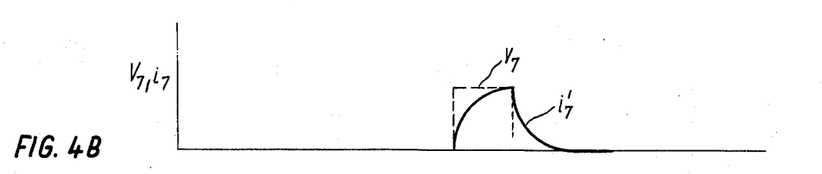
FIGS. 4b, 5b and 6b are composite curves illustrating the excitation of the successive conductors of FIG. 3 by substantially rectangular voltage pulses to produce current distributions which approximate the idealized current distributions of FIGS. 4a, 5a and 5a, respectively.
Figure 5B:
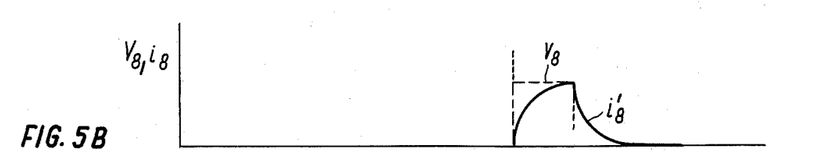
Figure 6B:
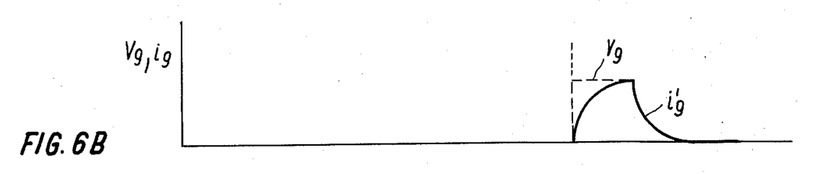
Figure 7:
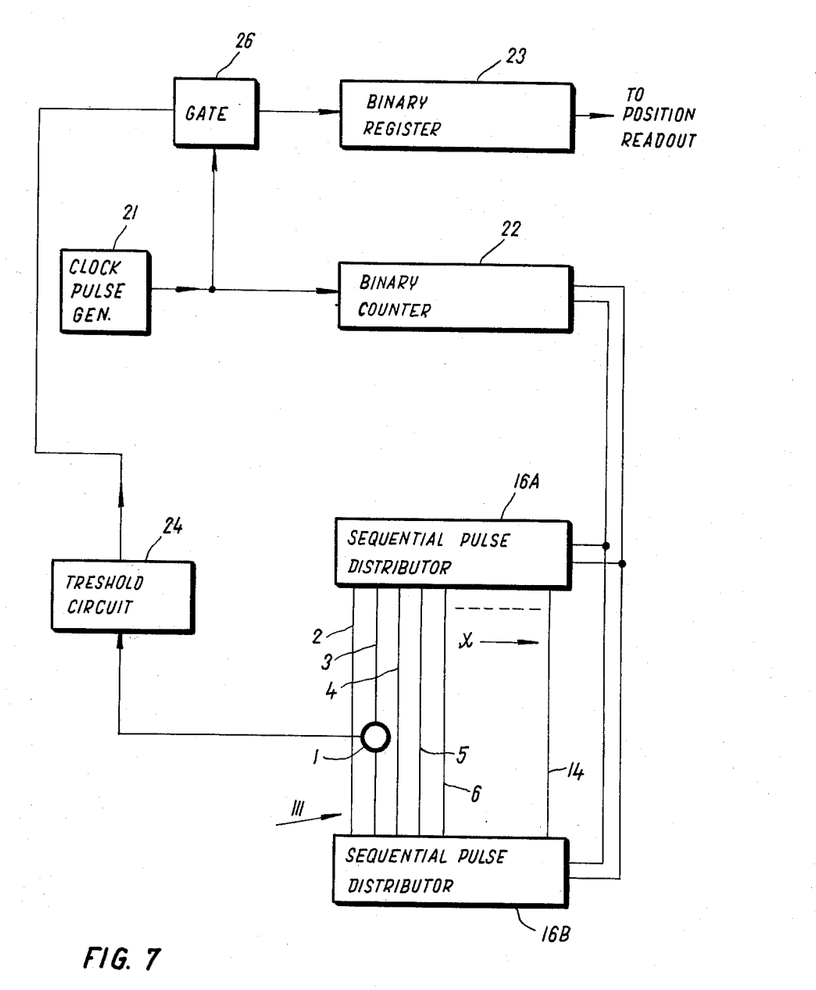
FIG. 7 is a block diagram illustrating a first arrangement for electromagnetically sensing and indicating the position of an inductive sensor in accordance with the invention.

In FIG. 7, a conventional clock pulse generator 21 excites a count input of a binary counter 22, whose lowest order output is applied to an input of the pulse distributor 16, which for convenience is divided in FIG. 7 into a pair of identical sub-circuits 16a and 16b. The distributor 16 routes the successive, substantially rectangular voltage pulses from the counter 22 to the input of the successive conductors 2-14 of the array 111. The counter 22 and the distributor 16 cooperate in such manner that the trailing edge of the rectangular voltage pulse applied to each of the conductors of the array substantially coincides with the leading edge of the next pulse applied to the succeeding conductor of the array, as is clearly shown for the conductors 7-9 in FIGS. 4b 5b and 6b, respectively.

The distribution of voltage pulses set forth in FIGS. 4a-6a yields, in the associated conductor, a corresponding current distribution which approximates the idealized current distribution of the above-described FIGS. 4a-6a. As a result, the resulting travelling wave magnetic field set up by the array 111 will approximate the desired continuous form.

The induced voltage response of the sensing element 1 is coupled to the input of a suitable threshhold element 24, which is adapted to yield an output pulse indication at the time when such induced voltage response exhibits the desired value, e.g., the value 106 in FIG. 2. The output of the threshhold element is applied to an inhibit control input of a gate 26, whose main input is coupled to the output of the clock pulse generator 21. The pulses from the generator 21, which are initiated in a conventional way at the start of excitation of the array 111 by the counter 22 and the distributor 16, pass through the gate 26 to increment a serial-input binary register 23 so long as the gate 26 remains enabled. At the instant when the induced voltage resonse of the sensing element 1 reaches the value 106 indicative of the position of the corresponding cursor, the threshhold element 24 inhibits the gate 26 and stops the accumulated count in the register 23. As a result, the corresponding attained count in the register 23 is a measure of the relative position of the sensing element 1 along the coordinate X.

Figure 8A:
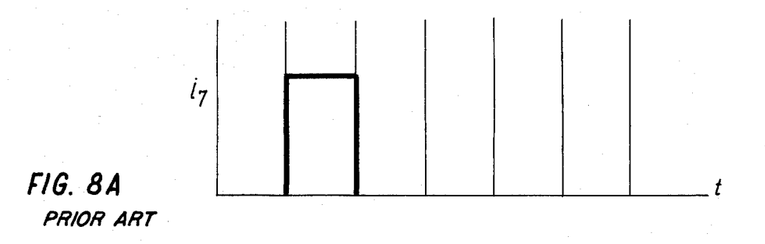
FIGS. 8a, 8b and 8c are a set of curves illustrating a prior art technique for exciting the successive conductors of an array similar to that of FIG. 3 with spaced rectangular current pulses.
Figure 8B:
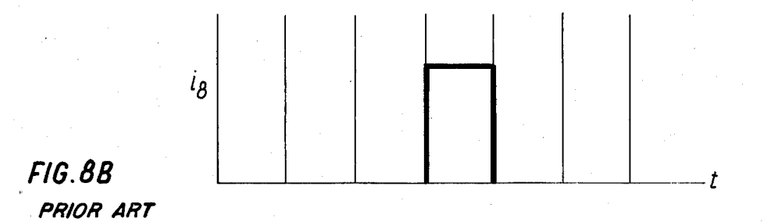
Figure 8C:
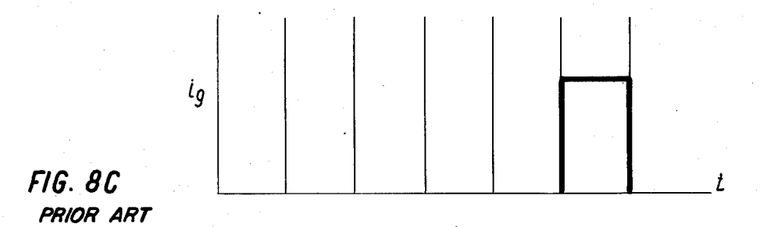
Figure 9:
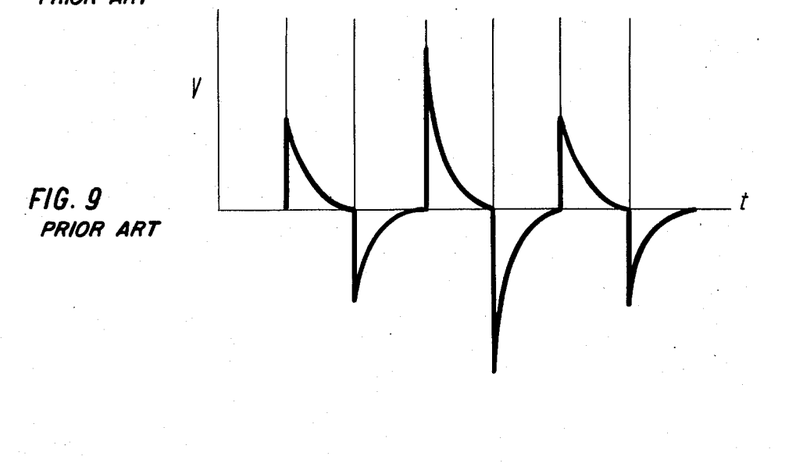
FIG. 9 is a curve representing the induced voltage of the sensing element when associated with an array of conductors excited in the manner depicted in FIGS. 8a–8c.

For purposes of comparison of the excitation scheme illustrated in FIGS. 4b-6b, a typical prior art arrangement of conductor excitation is shown in FIGS. 8a-8c relative to the same conductors 7-9. As noted, the known form of excitation defines spaced rectangular current pulses, yielding an induced voltage response in the sensing element in the discrete form shown in FIG. 9. The wave form of FIG. 9 is a succession of discrete amplitude spikes, such spikes occurring at and corresponding to the successive conductors in the array. It will be noted that, in comparison with the wave form of FIG. 2, such discrete characteristic has a relatively low resolution and is difficult to interpolate accurately unless the number of and spacing between the successive spikes (and thereby the nuber of conductors) is extremely large. By contrast, the essentially continuous nature of the generation and sensing of the induced voltage response of FIG. 2 is substantially independent of the size of the covered field and, within limits, the number of conductors.

Figure 10:
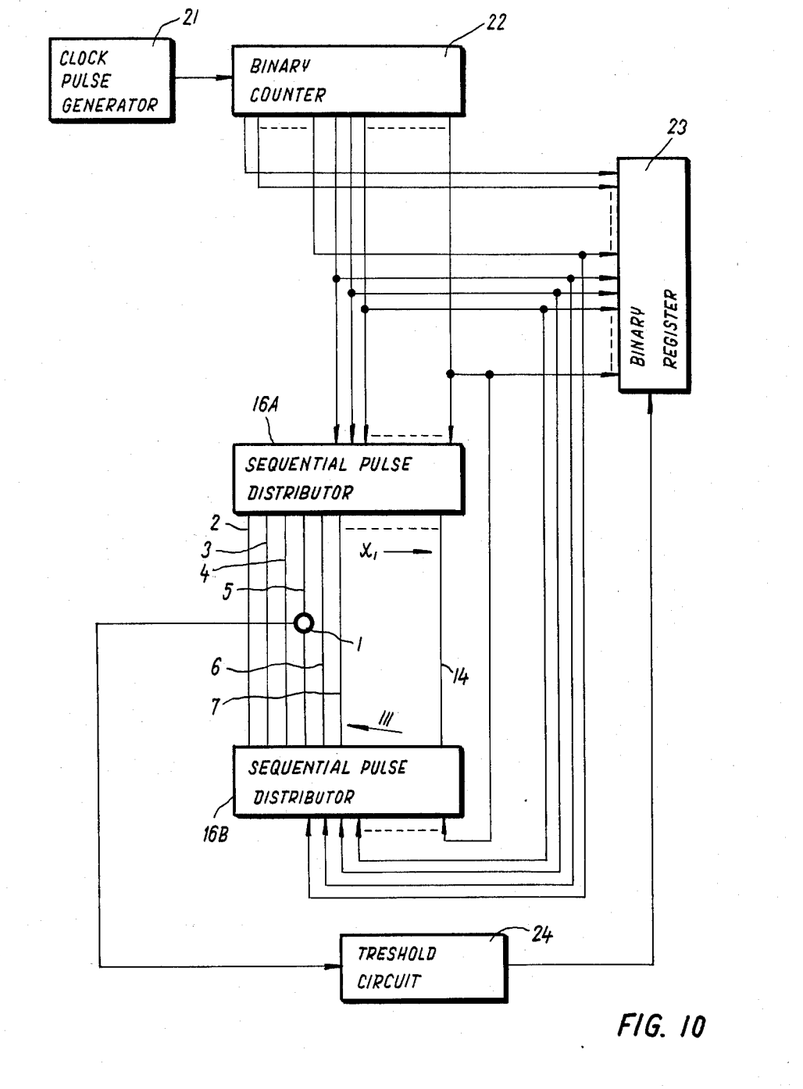
FIG. 10 is a block diagram illustrating a second embodiment of arrangement in accordance with the invention for electromagnetically ascertaining the position of an inductive sensing element.

FIG. 10 illustrates a block diagram of a circuit similar to that of FIG. 7 but incorporating parallel-input digital elements. In particular, the respective halves 16a and 16b of the pulse distributor have a succession of inputs which are coupled to successively higher order outputs of the binary counter 22. (Illustratively, only a sequence of relatively higher order stages of the counter 22 are coupled to the inputs of the circuit 16). The circuit 16 distributes the successive pulses on its input to the successive conductors of the associated conductors 2-14 in the array 111 to define an appropriate pattern of excitation of the array 111 with rectangular voltage pulses.

As in FIG. 7, the sensing element 1 in FIG. 10 is applied to the threshhold circuit 24, which operates in the manner indicated above. The output indication of the threshhold circuit 24 is applied to an auxiliary inhibiting port of a parallel-input binary register 23. The successively higher order inputs of the register 23 are individually coupled to the corresponding successively higher order outputs of the binary counter 22, which as in FIG. 7 is excited by the clock pulse generator 21.

With the arrangement of FIG. 10, the register 23 accumulates the counter of the binary counter so long as no inhibiting pulse is applied to the register 23. When the induced voltage of the sensing element 1 reaches the value 106 as shown in FIG. 2, the circuit 24 (FIG. 10) inhibits the register 23 and stops the count in the manner described above.

Figure 11A:
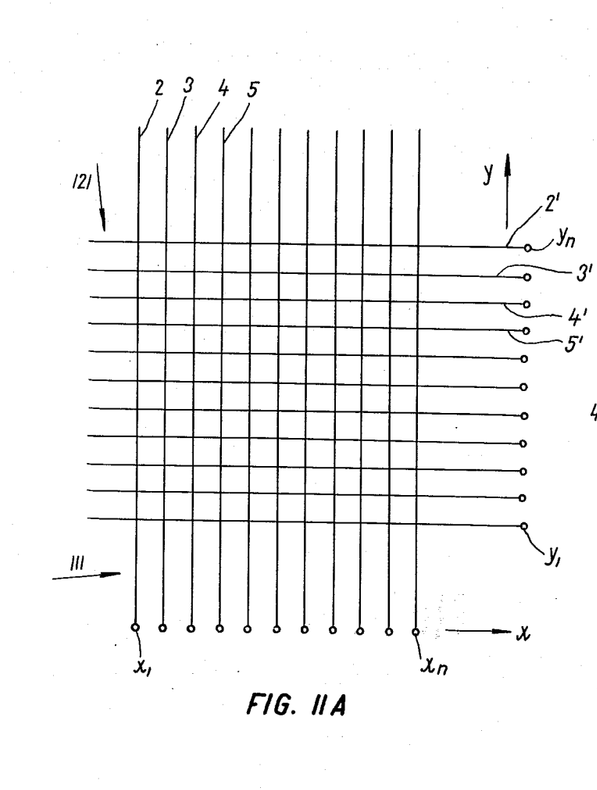
FIG. 11a is a diagrammatic representation of an array of conductors suitable for use in the arrangements of FIGS. 7 and 10 for the electromagnetic determination of sensor position in two rectangular coordinates.

The above-described arrangement of the present invention can be adapted for multi-coordinate systems by appropriately arranging two or more arrays of conductors along the desired coordinates, and by exciting the individual arrays in the general manner described. FIG. 11a illustrates a rectangular-coordinate system including the array 111 for measuring the position of the sensing element (not shown) in the direction X, and also including a second array 121 formed from conductors 2', 3', etc., which are adapted to measure the position of such sensing element in an orthogonal direction Y.

Figure 11B:
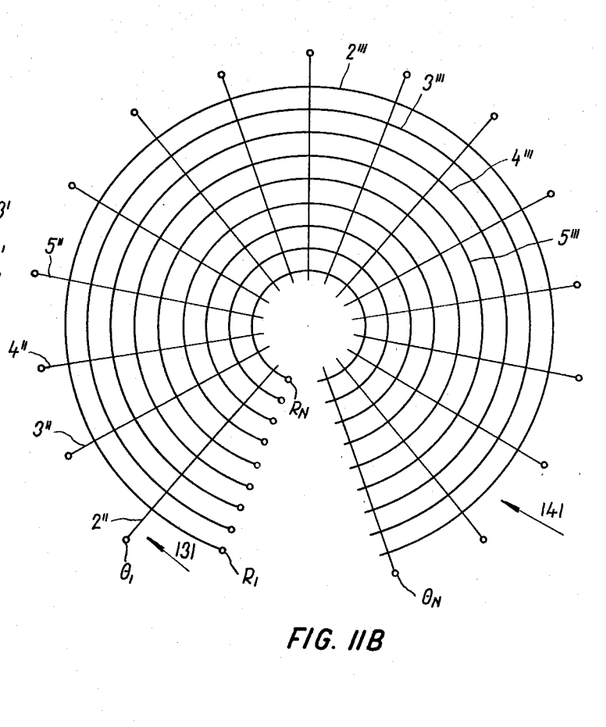
FIG. 11b is a diagrammatic representation of an arrangement of conductors suitable for use with the facilities of FIGS. 7 and 10 to electromagnetically sense the position of a sensing element in polar coordinates.

In FIG. 11b, an arrangement of conductors suitable for measuring the position of the sensing element in polar coordinates is depicted. The arrangement includes an array 131 of conductors 2", 3", 4", etc., which are arranged to measure the angular coordinate of the system. In addition, an array 41, consisting of conductors 2''', 3''', 4''', etc., is arranged to measure the position of the sensing element along the radial coordinate of the system.

In the foregoing, various examples of the inventive technique have been described. Many variations and modifications will now occur to those skilled in the art. It is accordingly desired that the scope of the appended claims not be limited to the specific disclosure herein contained.

What is claimed is:

1. In a method of electromagnetically determining the relative position of an inductive sensing element along a specified first direction, the method comprising the steps of exciting an array of parallel conductors sequentially arranged in the first direction and disposed in magnetic coupling relation with the sensing element with current pulses to vary the induced voltage response of the sensing element, and measuring the time of occurrence of a prescribed value of such induced voltage with respect to the start of an excitation interval of the conductors as a measure of the distance, in the first direction, of the sensing element from a reference point, the improvement wherein the excitation step comprises energizing the conductors by a consecutive sequence of adjacent substantially rectangular voltage pulses to yield a resultant substantially continuous, travelling-wave magnetic field along the first direction to produce a correspondingly continuous induced voltage response in the sensing element and in which the measuring step comprises determining the instant relative to the start of the energization of the conductors at which the continuous voltage response induced in the sensing means reaches a predetermined value in a prescribed sense.

2. In an apparatus including an array of parallel conductors sequentilly arranged transversally in a first direction for sensing the relative position, in such first direction, of an inductive sensing element disposed in magnetic coupling relation to the array of conductors, means for generating a sequence of adjacent substantially rectangular voltage pulses, means for exciting successive ones of the conductors in the array with successively adjacent ones of the voltage pulses to produce in said conductors an overlapping current distribution which yields a substantially continuous, travelling-wave magnetic field along the first direction to correspondingly generate a continuous induced voltage response of the sensing means, threshhold circuit means coupled to the output of the sensing means for producing an output indication when the continuous induced voltage response of the sensing means reaches a predetermined value in a prescribed sense, and means for detecting the interval between the start of excitation of the conductors and the occurrence of the output indication from the threshhold circuit means.

3. Apparatus as defined in claim 2, in which the sensing means is disposed in spaced relation to the array of conductors along the first direction, and in which the apparatus further comprises a continuous conductive plate disposed in magnetic coupling relation to and intermediate the sensing means and the array of conductors.

4. Apparatus as defined in claim 2, in which the means for generating a sequence of adjacent substantially rectangular voltage pulses comprise a clock pulse generator and the exciting means comprises, in combination, a binary counter, means for coupling the output of the clock pulse generator to the count input of the binary counter, means coupled to the inputs of the successive conductors of the array for distributing pulses applied to such distributing means to such conductor inputs, and means for applying at least one output of the binary counter to the input of the distributing means.

5. Apparatus as defined in claim 4, in which the distributing means comprises means for serially routing pulses applied to its input to the inputs of the successive conductors in the array, and in which the applying means comprises means for coupling the lowest order output of the binary counter to the inut of the routing means.

6. Apparatus as defined in claim 4, in which the distributing means comprises means including a succession of inputs for individually routing pulses applied to said succession of inputs to associated successive ones of the inputs of the array conductors, and in which the applying means comprises means for coupling successively higher order outputs of the binary counter to successive ones of the inputs of the routing means.

7. Apparatus as defined in claim 4, in which the interval detecting means comprises, in combination, a serial-input binary register, a gate, means for coupling the output of the clock pulse generator to the main input of the gate, means for coupling the output of the gate to the input of the binary register, and means coupling the output of the threshold circuit means to the control input of the gate for inhibiting said gate on the occurrence of an output from said threshold circuit means and thereby stopping the accumulated count in said register which is a measure of the position of said sensing element.

8. Apparatus as defined in claim 4, in which the interval detecting means comprises, in combination, a parallel-input binary register having an auxiliary inhibiting input, means for coupling successively higher order outputs of the binary counter to successively higher order inputs of the binary register, and means coupling the output of the threshold circuit means to the auxiliary inhibiting input of the binary register for inhibiting said binary register on the occurrence of an output from said threshold circuit means thereby stopping the accumulated count in said binary register which is a measure of the position of said sensing element.

* * * * *